US012657754B2

(12) United States Patent
Aufmuth et al.

(10) Patent No.: US 12,657,754 B2
(45) Date of Patent: Jun. 16, 2026

(54) METHOD AND SYSTEM FOR DETERMINING DIAMETER OF ELECTRICAL TRANSMISSION WIRES

(71) Applicant: Dewberry Engineers Inc., Fairfax, VA (US)

(72) Inventors: Eric Aufmuth, Amissville, VA (US); Ryan Ligon, Wilmington, NC (US); Eric McNeill, Evergreen, CO (US); Josh Novac, Lakewood, CO (US); Amar Nayegandhi, St. Petersburg, FL (US); Amy Larson, Rochester, MN (US)

(73) Assignee: Dewberry Engineers Inc., Fairfax, VA (US)

( * ) Notice: Subject to any disclaimer, the term of this patent is extended or adjusted under 35 U.S.C. 154(b) by 310 days.

(21) Appl. No.: 17/960,626

(22) Filed: Oct. 5, 2022

(65) Prior Publication Data

US 2024/0119616 A1    Apr. 11, 2024

(51) Int. Cl.
*G06T 7/62*　　　(2017.01)
*G06T 7/00*　　　(2017.01)
*G06V 10/764*　　(2022.01)

(52) U.S. Cl.
CPC ................. *G06T 7/62* (2017.01); *G06T 7/97* (2017.01); *G06V 10/764* (2022.01); *G06T 2207/20081* (2013.01); *G06T 2207/20216* (2013.01)

(58) Field of Classification Search
CPC ... G06T 7/62; G06T 7/97; G06T 2207/20081; G06T 2207/20216; G06V 10/764; G06V 20/17
See application file for complete search history.

(56) References Cited

U.S. PATENT DOCUMENTS

| | | | | |
|---|---|---|---|---|
| 2016/0232792 A1* | 8/2016 | van Cruyningen | .... | G01C 11/02 |
| 2016/0372231 A1* | 12/2016 | Yabe | .................... | H01B 7/0045 |
| 2020/0005738 A1* | 1/2020 | Ishii | ...................... | H04N 23/698 |
| 2020/0134853 A1* | 4/2020 | Milici | ........................ | G06T 7/80 |
| 2020/0288618 A1* | 9/2020 | Davey | .................... | G01V 3/088 |

(Continued)

FOREIGN PATENT DOCUMENTS

| | | | | |
|---|---|---|---|---|
| CN | 114492860 A | * | 5/2022 | |
| KR | 102344195 B1 | * | 12/2021 | ............. B64U 10/13 |

*Primary Examiner* — Henok Shiferaw
*Assistant Examiner* — Woo C Rhim
(74) *Attorney, Agent, or Firm* — .Buchanan Ingersoll & Rooney PC

(57) ABSTRACT

A computer-implemented method, a system, and a non-transitory computer readable medium for determining diameter of an electrical transmission wire. The method includes receiving, on a processing server, data for one or more images, the one or more images including one or more electrical transmission wires captured by an optical instrument; receiving, by the processing server, a distance from the optical instrument to the one or more electrical transmission wires; receiving, by the processing server, a number of pixels across the one or more electrical transmission wires in the one or more images; and calculating, with the processing server, an estimated diameter of the one or more electrical transmission wires based on the distance from the optical instrument to the one or more electrical transmission wires and the number of pixels across the one or more electrical transmission wires in the one or more images.

20 Claims, 11 Drawing Sheets

(56)　　　　　References Cited

U.S. PATENT DOCUMENTS

| | | | |
|---|---|---|---|
| 2023/0133480 A1* | 5/2023 | Kim ....................... | G06V 10/16 |
| | | | 701/10 |
| 2023/0267635 A1* | 8/2023 | Fitzpatrick ................ | G06T 7/60 |
| | | | 382/100 |
| 2024/0028871 A1* | 1/2024 | Chiu ....................... | G06T 7/143 |
| 2024/0119616 A1* | 4/2024 | Aufmuth ................... | G06T 7/97 |

* cited by examiner

140

200

Application 1

Figure 3:
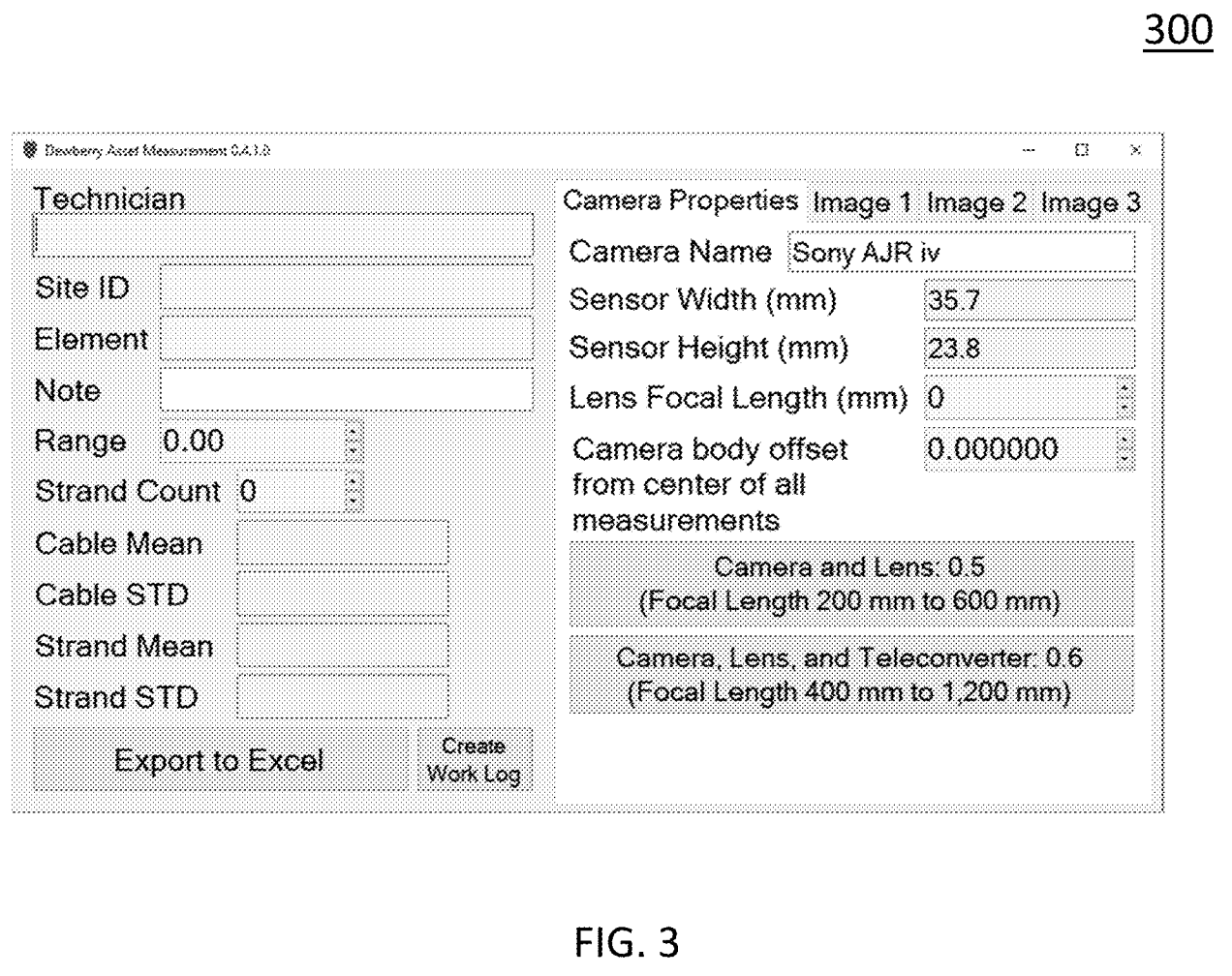

Bradbury Asset Measurement 5.4.1.3

| | Camera Properties | Image 1 | Image 2 | Image 3 |
|---|---|---|---|---|

Technician

Camera Name    Sony AJR iv

Site ID

Sensor Width (mm)    35.7

Element

Sensor Height (mm)    23.8

Note

Lens Focal Length (mm)    0

Range    0.00

Camera body offset    0.000000
from center of all
measurements

Strand Count    0

Cable Mean

Cable STD

Camera and Lens  0.5
(Focal Length 200 mm to 600 mm)

Strand Mean

Strand STD

Camera, Lens, and Teleconverter  0.6
(Focal Length 400 mm to 1,200 mm)

Export to Excel

Create
Work Log

Figure 4:
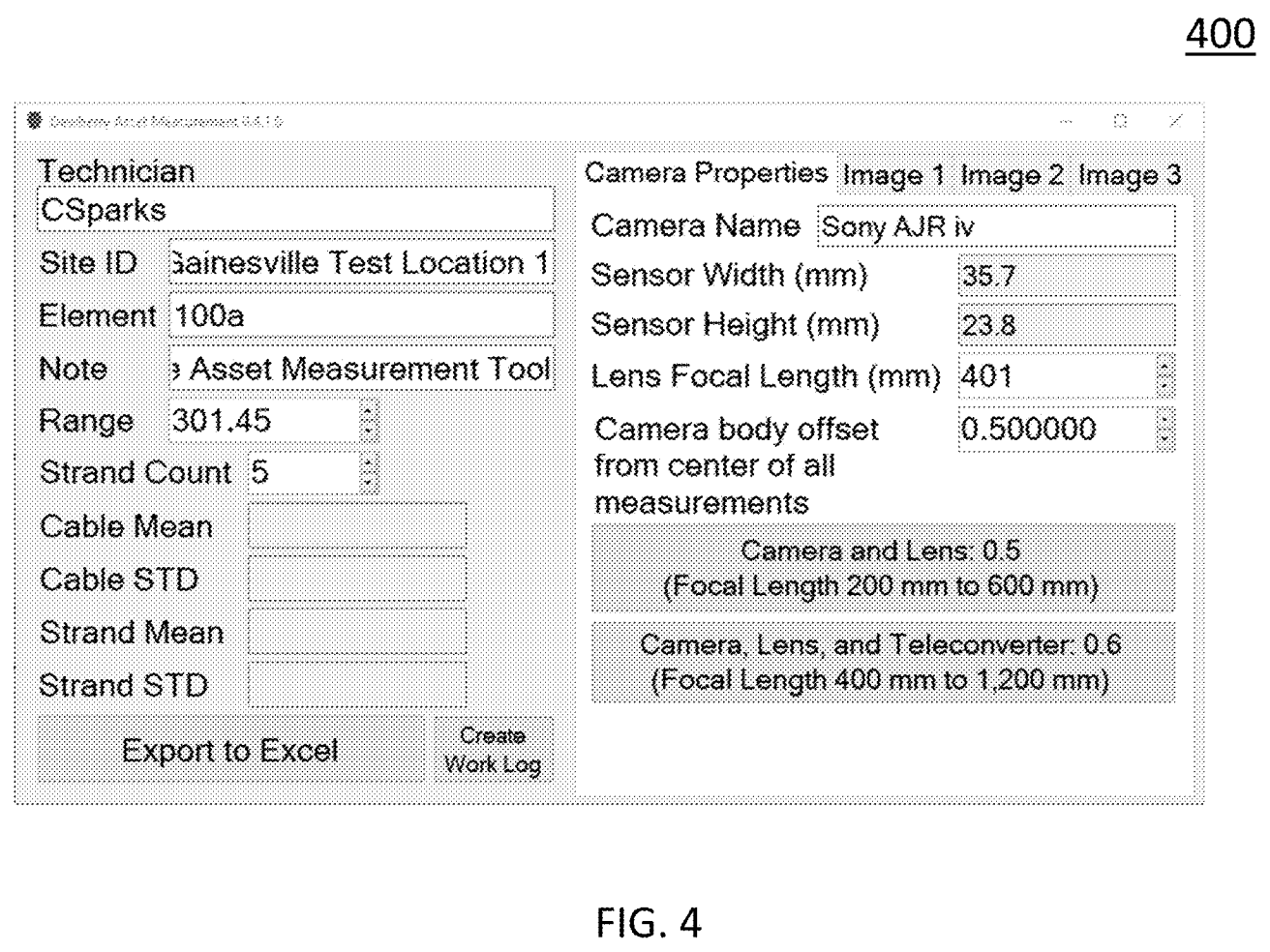

Technician
CSparks

Site ID  Gainesville Test Location 1

Element  100a

Note  3 Asset Measurement Tool

Range  301.45

Strand Count  5

Cable Mean

Cable STD

Strand Mean

Strand STD

Export to Excel          Create Work Log

Camera Properties | Image 1 | Image 2 | Image 3

Camera Name  Sony AJR iv

Sensor Width (mm)  35.7

Sensor Height (mm)  23.8

Lens Focal Length (mm)  401

Camera body offset from center of all measurements  0.500000

Camera and Lens: 0.5
(Focal Length 200 mm to 600 mm)

Camera, Lens, and Teleconverter: 0.6
(Focal Length 400 mm to 1,200 mm)

Figure 7:
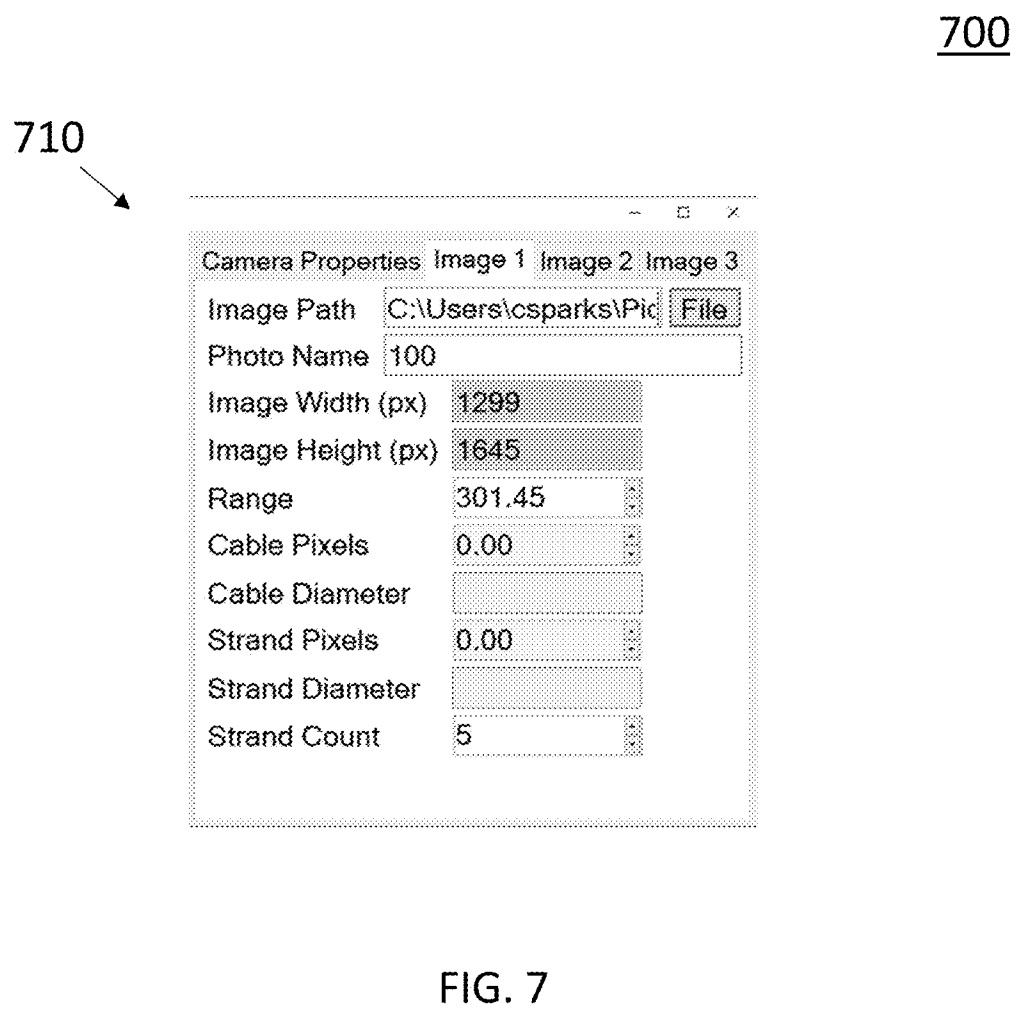

Camera Properties  Image 1  Image 2  Image 3

| Image Path | C:\Users\csparks\Pic | File |
| Photo Name | 100 | |
| Image Width (px) | 1299 | |
| Image Height (px) | 1645 | |
| Range | 301.45 | |
| Cable Pixels | 0.00 | |
| Cable Diameter | | |
| Strand Pixels | 0.00 | |
| Strand Diameter | | |
| Strand Count | 5 | |

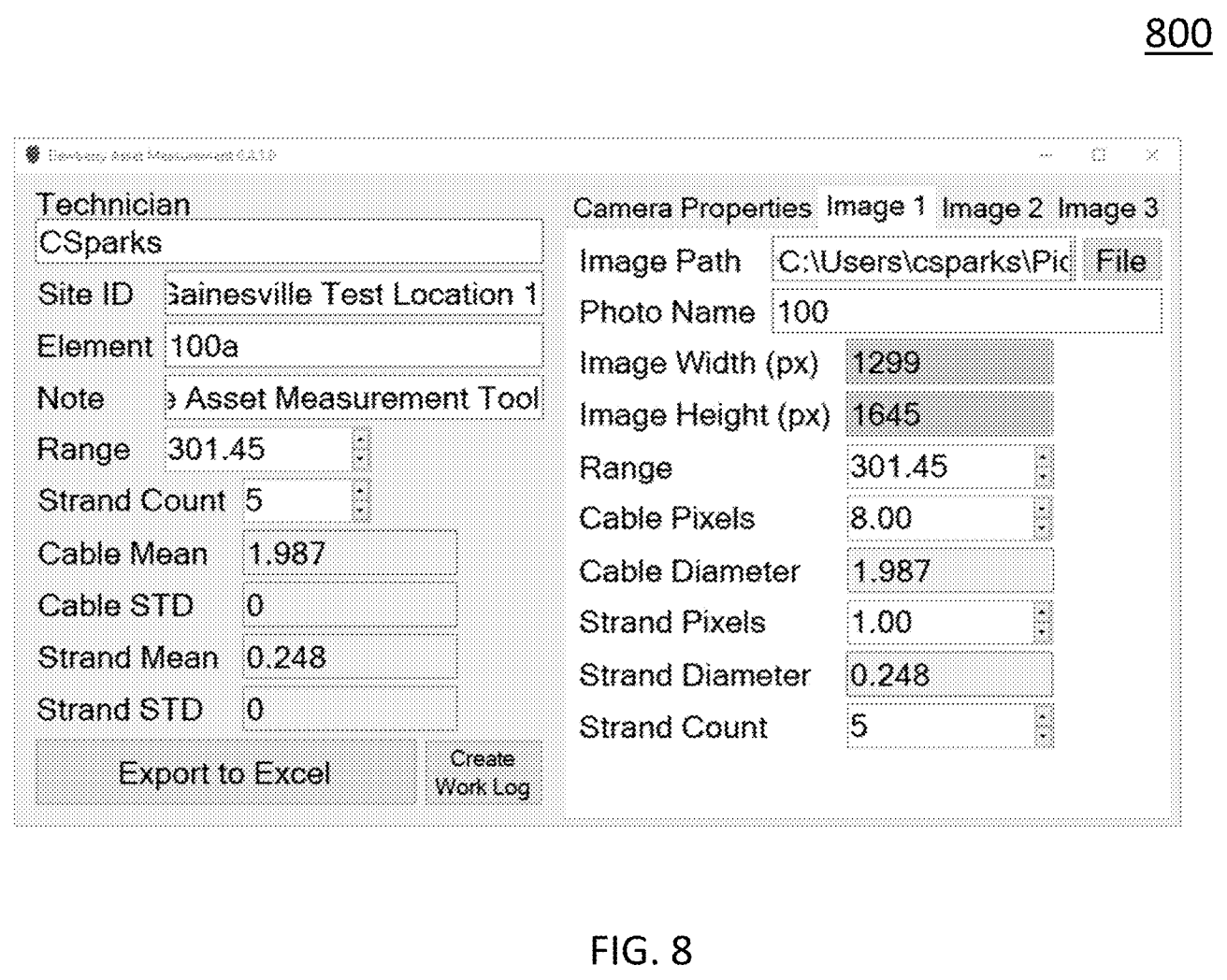

| Technician | | |
|---|---|---|
| CSparks | | |
| Site ID | Gainesville Test Location 1 | |
| Element | 100a | |
| Note | s Asset Measurement Tool | |
| Range | 301.45 | |
| Strand Count | 5 | |
| Cable Mean | 1.987 | |
| Cable STD | 0 | |
| Strand Mean | 0.248 | |
| Strand STD | 0 | |

Export to Excel

Create Work Log

Camera Properties  Image 1  Image 2  Image 3

| Image Path | C:\Users\csparks\Pic | File |
|---|---|---|
| Photo Name | 100 | |
| Image Width (px) | 1299 | |
| Image Height (px) | 1645 | |
| Range | 301.45 | |
| Cable Pixels | 8.00 | |
| Cable Diameter | 1.987 | |
| Strand Pixels | 1.00 | |
| Strand Diameter | 0.248 | |
| Strand Count | 5 | |

FIG. 8

| Technician | SiteID | Element | Note | Photos | Measuren | Measuren | Measuren | Avg Diame | Standard | Margin of | Strand Me | Strand Me | Strand Me | Avg Strand | Strand Co |
|---|---|---|---|---|---|---|---|---|---|---|---|---|---|---|---|
| CSparks | Testing Si | 100 | Testing im | 100, 101, 1 | 1.547 | 1.51 | 1.533 | 1.53 | 0.015 | 0.038 | 0.221 | 0.168 | 0.139 | 0.176 | 10 |
| CSparks | Testing Si | 100a | Testing im | 100, 101, 1 | 1.328 | 1.343 | 1.395 | 1.355 | 0.029 | 0.071 | 0.221 | 0.168 | 0.139 | 0.176 | 8 |
| CSparks | Testing Si | 100b | Testing im | 100, 101, 1 | 1.777 | 1.854 | 1.82 | 1.817 | 0.032 | 0.078 | 0.222 | 0.337 | 0.28 | 0.28 | 8 |
| CSparks | Testing Si | 100d | Testing im | 100, 101, 1 | 1.323 | 1.339 | 1.321 | 1.328 | 0.008 | 0.02 | 0.221 | 0.167 | 0.139 | 0.176 | 10 |

900

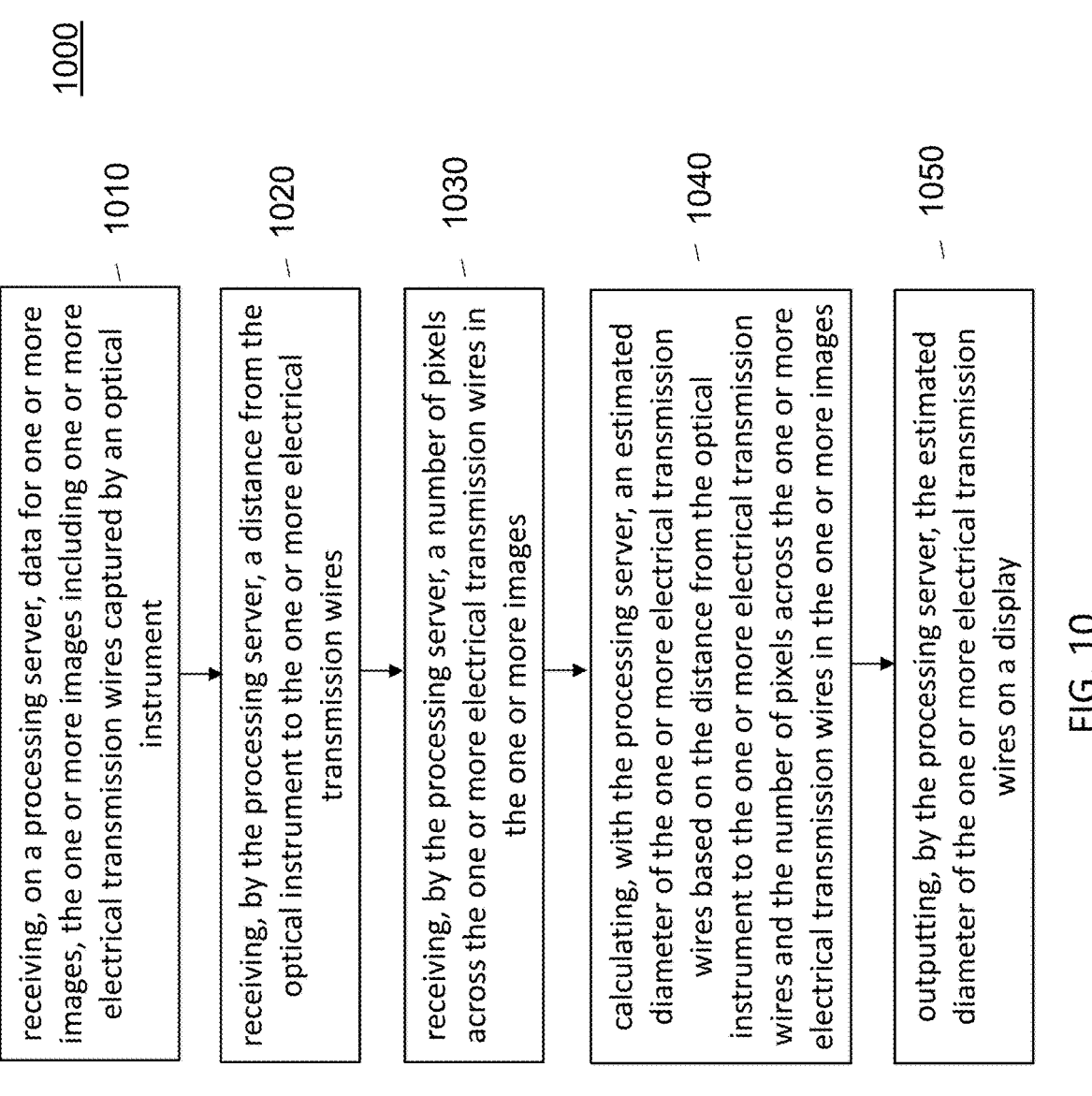

1000

1010 — receiving, on a processing server, data for one or more images, the one or more images including one or more electrical transmission wires captured by an optical instrument 1020 — receiving, by the processing server, a distance from the optical instrument to the one or more electrical transmission wires 1030 — receiving, by the processing server, a number of pixels across the one or more electrical transmission wires in the one or more images 1040 — calculating, with the processing server, an estimated diameter of the one or more electrical transmission wires based on the distance from the optical instrument to the one or more electrical transmission wires and the number of pixels across the one or more electrical transmission wires in the one or more images 1050 — outputting, by the processing server, the estimated diameter of the one or more electrical transmission wires on a display

METHOD AND SYSTEM FOR DETERMINING DIAMETER OF ELECTRICAL TRANSMISSION WIRES

TECHNICAL FIELD

The present disclosure generally relates to a method and system for determining diameter of electrical transmission wires, and more particularly, a method and system for determining diameter of electrical transmission wires for electrical load transmission that allows crews to safely and accurately measure power transmission line wire diameter from the ground without coming into contact with the power lines.

BACKGROUND

Internal studies of electrical equipment, power lines, switches, and various other energized components are often performed to help ensure that the equipment can safely handle the electrical loads being passed through the equipment, and, if in doubt, to identify and correct potential problems before the problems occur. However, since detailed as-built information on power lines built, for example, in the 1960s and 1970s may not meet the standards of today's record keeping requirements, it would be desirable to have a system and method that can help ensure that the equipment in the field and power loads received by the equipment is compliant with regulatory requirements.

SUMMARY

Accordingly, system and method are disclosed that can determine the wire diameter of power lines with relatively high tolerances without coming into contact with any energized equipment, and which could be performed on a plurality of power lines and substations across a service area in a relatively short time.

In accordance with an aspect, a computer-implemented method for determining diameter of an electrical transmission wire, the method comprising: receiving, on a processing server, data for one or more images, the one or more images including one or more electrical transmission wires captured by an optical instrument; receiving, by the processing server, a distance from the optical instrument to the one or more electrical transmission wires; receiving, by the processing server, a number of pixels across the one or more electrical transmission wires in the one or more images; calculating, with the processing server, an estimated diameter of the one or more electrical transmission wires based on the distance from the optical instrument to the one or more electrical transmission wires and the number of pixels across the one or more electrical transmission wires in the one or more images; and outputting, by the processing server, the estimated diameter of the one or more electrical transmission wires on a display.

In accordance with another aspect, a system for determining diameter of an electrical transmission wire, the system comprising: an optical instrument configured to capture one or more images including one or more electrical transmission wires; a distance measuring device configured to determine a distance from the optical instrument to the one or more electrical transmission wires; and a processing server configured to: receive data for the one or more images captured by the optical instrument; receive the distance from the optical instrument to the one or more electrical transmission wires from the distance measuring device; receive a number of pixels across the one or more electrical transmission wires in the one or more images; calculate an estimated diameter of the one or more electrical transmission wires based on the distance from the optical instrument to the one or more electrical transmission wires and the number of pixels across the one or more electrical transmission wires in the one or more images; and output the estimated diameter of the one or more electrical transmission wires to a display.

In accordance with a further aspect, a non-transitory computer readable medium storing computer readable program code that, when executed by a processor, causes the processor to determine a diameter of an electrical transmission wire, the program code comprising instructions for: receiving data for one or more images, the one or more images including one or more electrical transmission wires captured by an optical instrument; receiving a distance from the optical instrument to the one or more electrical transmission wires; receiving a number of pixels across the one or more electrical transmission wires in the one or more images; calculating an estimated diameter of the one or more electrical transmission wires based on the distance from the optical instrument to the one or more electrical transmission wires and the number of pixels across the one or more electrical transmission wires in the one or more images; and sending the estimated diameter of the one or more electrical transmission wires to a display.

BRIEF DESCRIPTION OF THE DRAWINGS

FIG. 2 is an illustration of a computer system with an asset management system that can determine wire diameter for electrical load transmission in accordance with an exemplary embodiment.

FIG. 3 is an illustration of a graphical user interface (GUI) of the asset management system in accordance with an exemplary embodiment.

FIG. 4 is an illustration of the graphical user interface of FIG. 3 populated with data to determine wire diameter for electrical load transmission in accordance with an exemplary embodiment.

FIG. 7 is an illustration of a browse file dialogue and image data for the asset management system in accordance with an exemplary embodiment.

FIG. 8 is another illustration of the graphical user interface of the asset management system in accordance with an exemplary embodiment.

FIG. 10 is a flowchart illustrating a method for determining wire diameter for electrical load transmission in accordance with an exemplary embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
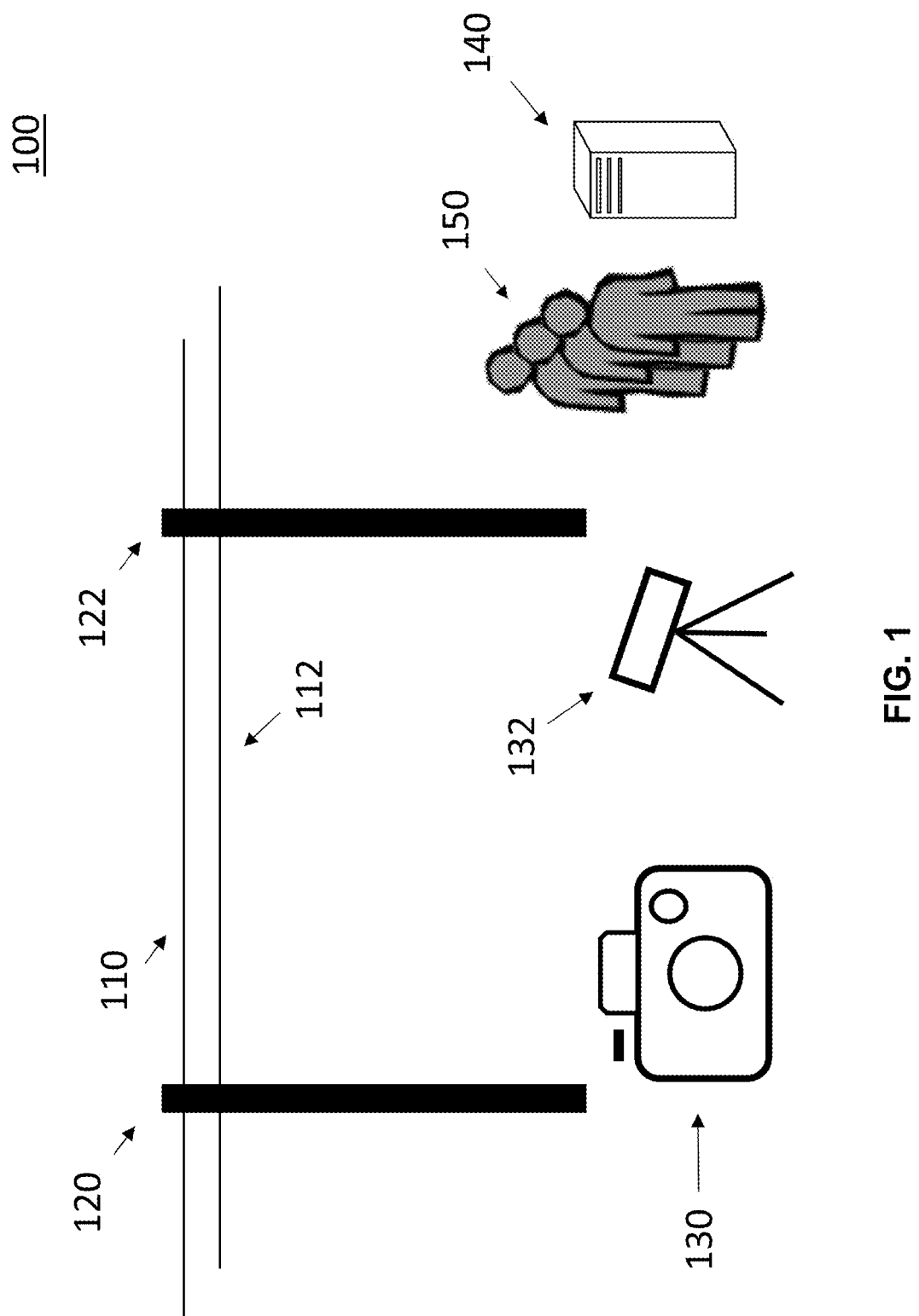
FIG. 1 is an illustration of a system for determining wire diameter for electrical load transmission in accordance with an exemplary embodiment.

FIG. 1 is an illustration of a system 100 for determining wire diameters for electrical load transmission in accordance with an exemplary embodiment. As shown in FIG. 1, the system 100 can include one or more transmission wires (or power lines) 110, 112, which can be support by one or more transmission towers or poles 120, 122. In addition, the system 100 can include one or more optical imaging devices (or cameras) 130, one or more distance measuring devices (or range finders) 132, and one or more computer systems 140.

In accordance with an exemplary embodiment, the one or more optical imaging devices (or camera) 130 can be, for example, a digital single-lens reflex (SLR) still camera that includes one or more telephoto lens having one or more lengths form 85 mm to over 300 mm in a 35 mm film format. For example, the one or more telephoto lenses can include a short telephoto (85-135 mm in 35 mm film format), a medium telephoto (135-300 mm in 35 mm film format), and super telephoto (over 300 mm in 35 mm film format). The one or more distance measuring devices (i.e., a rangefinder) 132 can be, for example, any device that can measure distances to a remote object such a wire 110, 112. In accordance with an embodiment, the optical imaging devices (or camera) 130 and the distance measuring device 132 can be integrated into a single device, for example, a housing.

In accordance with an exemplary embodiment, the one or more computer systems 140 can include, for example, a laptop or tablet that includes a processor or central processing unit (CPU), and one or more memories for storing software programs and data. The processor or CPU carries out the instructions of a computer program, which operates and/or controls at least a portion of the functionality of the devices the one or more computer systems 140. The one or more computer systems 140 can also include an operating system (OS), which manages the computer hardware and provides common services for efficient execution of various software programs.

In accordance with an embodiment, as set forth, the system and method use photogrammetry and the use of photography, for example, in surveying and mapping to measure distances between objects for the safety of the crews 150 that execute the method and system as disclosed herein. In particular, rather than using less-safe methods involving field personnel, for example, applying calipers from a bucket truck to the power line in order to obtain data, photogrammetry allows a crew 150 to generate the required information safely from the ground at a safe distance without the need to come in contact with the power lines or other transmission equipment. Photogrammetry also works well, for example, for certain locations where vehicle access is not possible. In addition, because the method and system can be easily replicable, different survey crews can be dispatched throughout one or more regions, which can help reduce travel costs for a client and potential burn-out of any single crew 150.

In accordance with an exemplary embodiment, survey crews 150 photograph the transmission or power lines 110, 112 from a relatively safe distance and then record the sensor height, width, and pixel count of the camera 130 in conjunction with a distance (i.e., a total station calculated distance) from camera 130 to the transmission or power line 110, 112. With this information entered into an asset measurement calculator, the size of a single square pixel in a captured image can be determined, for example, using a ground sampling distance calculator that has been used in fixed wing aerial photogrammetry. The crew 150 can capture several images at a fixed distance of one or more of the one or more transmission or power lines 110, 112, and then using an image viewer software, for example, Adobe Photoshop software, the method and system as disclosed herein can calculate the number of pixels across the one or more transmission or power lines 110, 112, which data can be entered into an asset measurement calculator to determine a diameter of the one or more transmission or power lines 110, 112. In accordance with an embodiment, the process can be repeated several times to calculate a mean diameter and a standard deviation for the one or more transmission or power lines 110, 112. In accordance with an exemplary embodiment, survey crews 150 can image, for example, photograph the transmission or power lines 110, 112 from a relatively safe distance and then record the details of the photographed image along with a measurement taken on the photo in conjunction with the distance from the transmission or power line 110, 112. With this information entered into an asset measurement application, the size of a single square pixel can be determined and extrapolate the number of pixels can be determined, which can be extrapolated to determine a diameter of the transmission or power line 110, 112, (i.e., diameter of a wire).

In accordance with an embodiment, the one or more crews 150 can capture several images of the one or more transmission or power lines 110, 112, at a fixed distance from the transmission or power line 110, 112, use image viewer software to zoom in and measure the pixels across the power line, and finally, enter the data into the asset measurement application to determine the power line diameter. The process can be repeated several times to calculate a mean diameter and a standard deviation to ensure accuracy and repeatability.

In accordance with an embodiment, with this process, data can be generated in real time (e.g., on-site) and the data (i.e., results) can be shared, for example, with a field representative of a client or company that may accompany the survey crew 150. In addition, data can be transmitted to the client in real-time, saving the client costly post processing time.

In accordance with an embodiment, the method and system as disclosed herein can provide detailed and accurate transmission line measurements acquired from a relatively safe distance instead of having the crew 150 having to come in contact with relatively high power transmission or power lines 110, 112. In addition, the method and system as disclosed herein is also much more efficient than mobilizing a bucket truck, for example, in terrain where access can be very limited to vehicles. In accordance with an embodiment, the data obtained can be run through an automated application to ensure consistent results, which are precise and repeatable.

Figure 2:
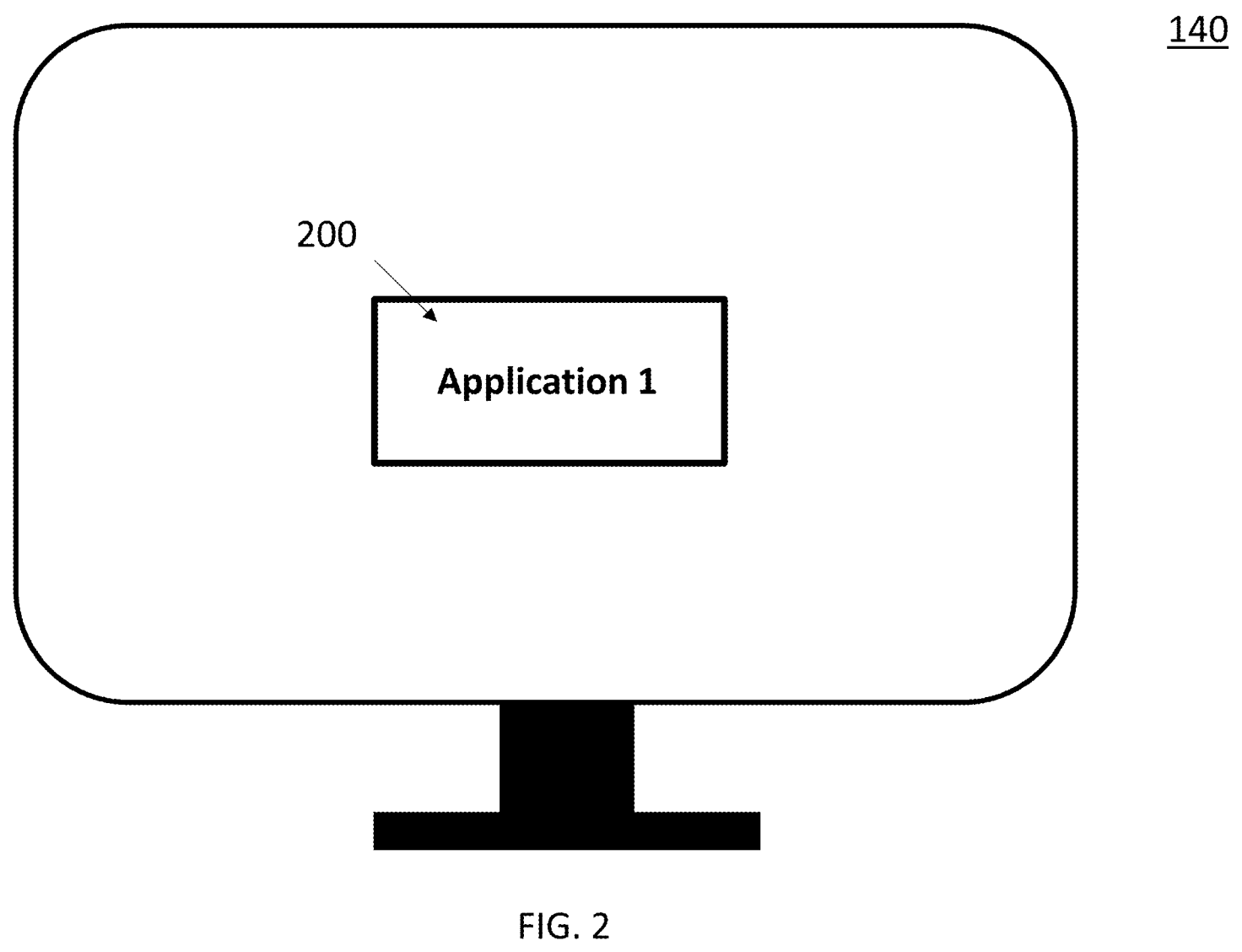

FIG. 2 is an illustration of a computer system 140 with an asset management system 200 that can determine wire diameters for electrical load transmission in accordance with an exemplary embodiment. As shown in FIG. 2, the system and method for determining a diameter of a power line (or transmission line) 110, 112 can be an application that is hosted, for example, in a portable computer system 140 that can be placed on-site. Alternatively, the computer system 140 can be remotely located from the site of the power line (or transmission line) 110, 112. In accordance with an embodiment, a desktop shortcut 210 can be created on the computer system 140 for the asset management system 200. For example, the desktop shortcut 210 can be double click on the desktop icon to open the asset management application 200.

FIG. 3 is an illustration of a graphical user interface 300 (GUI) of the asset management system 200 in accordance with an exemplary embodiment. Upon opening the application for the asset management system 200, a main screen can include entering one or more of a technician's name, site identifier (ID), element (i.e., identifier for the type or kind of the transmission or power line being photographed 110, 112), and any notes into the appropriate fields of the graphical user interface. In addition, for measurements, for example, a camera lens that is being used can be selected from a drop-down list by clicking on one of one or more options, for example, Option A—Camera and Lens: 0.5 (Focal Length 200 mm to 600 mm) or Option B—Camera, Lens, and Teleconverter: 0.6 (Focal Length 400 mm to 1,200 mm). The selected camera from the drop-down list can include corresponding information on sensor width (mm), sensor height (mm), lens focal length (mm), and camera body offset from center of all measurements. Next, the crew 150 can enter the measured range value, strand count, and lens focal length for the camera into the asset management system 200. However, if the strand width of the transmission or power line 110, 112, is not being measured, the value is set to 0.

FIG. 4 is an illustration of the graphical user interface 400 of FIG. 3 populated with data to determine wire diameters for electrical load transmission or power lines 110, 112 in accordance with an embodiment.

Figure 5:
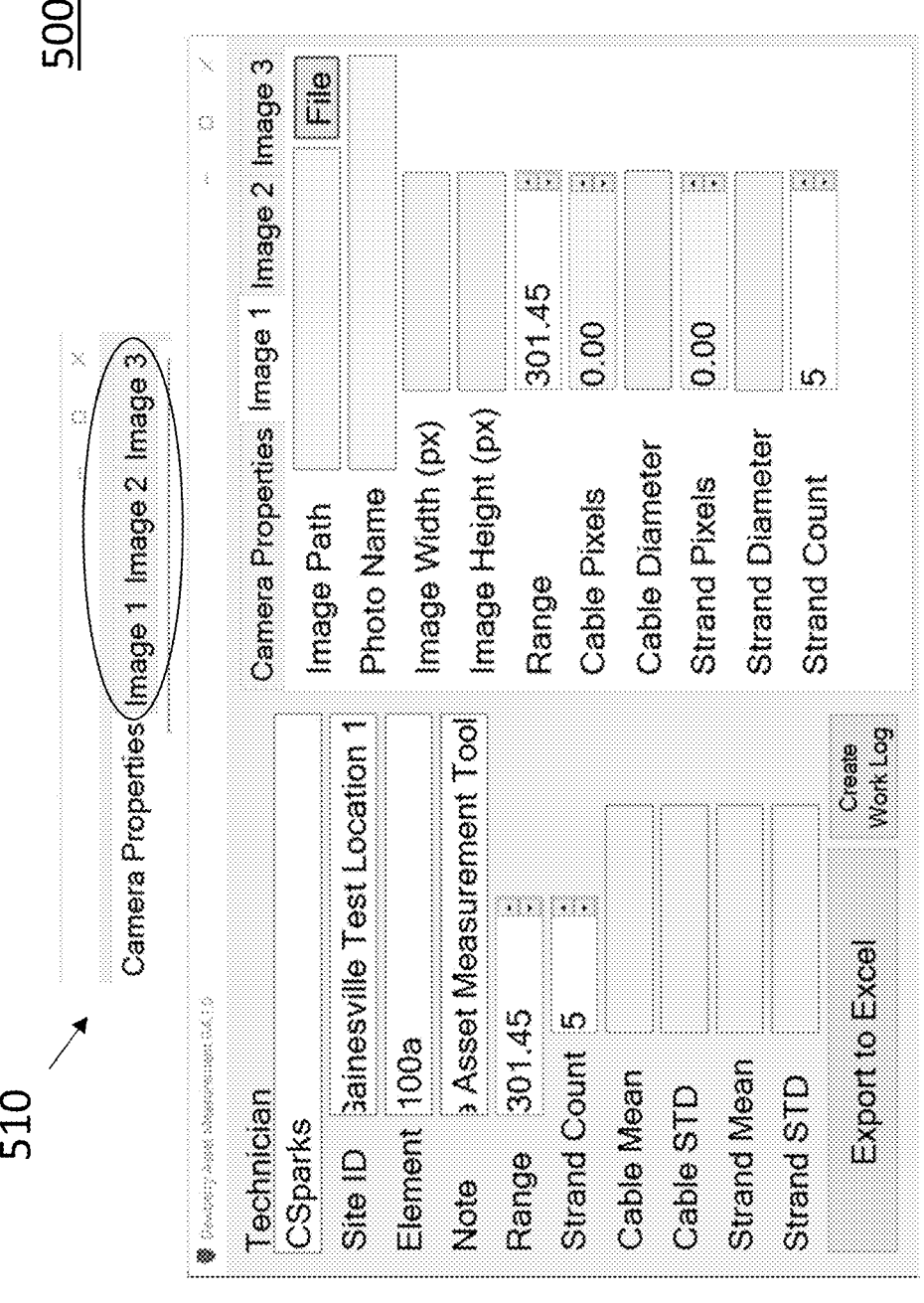
FIG. 5 is an illustration of a graphical user interface of FIG. 4 populated with data to determine wire diameter for electrical load transmission for a plurality of images in accordance with an exemplary embodiment.

FIG. 5 is an illustration of a graphical user interface 500 of FIG. 4 populated with data to determine wire diameters for electrical load transmission for a plurality of images in accordance with an exemplary embodiment. As shown in FIG. 5, the data can be entered for each of the images, which is being measured. The measurement information for the selected images 510, for example, Image 1, Image 2, and Image 3, can be entered into the asset management system 200. Each of the image tabs can be selected and the corresponding information can be entered and/or calculated as disclosed herein. For example, for each of the images 510, the image width (in pixels), the image height (in pixels), range, cable pixels, cable diameter, strand pixels, strand diameter, and strand count can be entered or populated for the camera properties.

Figure 6:
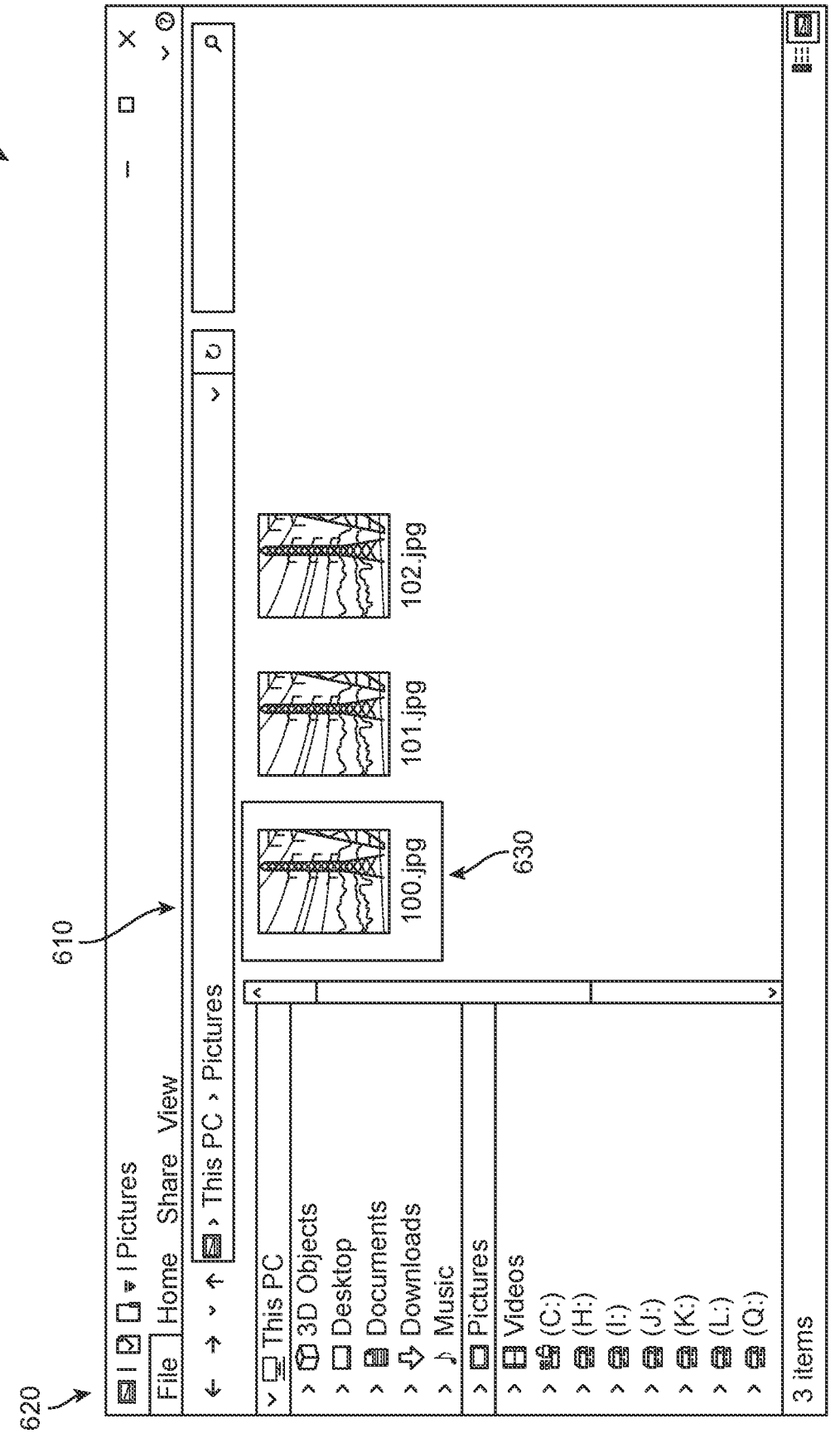
FIG. 6 is an illustration of a graphical user interface in which one or more images of wires can be selected in accordance with an exemplary embodiment.

FIG. 6 is an illustration of a graphical user interface 600 in which one or more images 610 of wires can be selected in accordance with an exemplary embodiment. In accordance with an embodiment, an image from a plurality of images is selected. The selected image can be selected by clicking on a "File button", for example, "File" 620 next to the image page and browsing the available images and selecting one or more of the images. For example, the crew 150 can select an image 630 by dragging and dropping the image from another open file explorer window. For example, by clicking the File button and browsing to the image, and then clicking on the "File" button, the user can browse to the location on the computer system 140 that contains the images (or photographs) 610. A default can be to retrieve the images 610 from, for example, This PC\Pictures.

FIG. 7 is an illustration of a browse file dialogue and image data 700 for the asset management system 200 in accordance with an exemplary embodiment. As shown in FIG. 7, the crew 150 can click "Open" on the Open photo dialogue and the image data will update for Image 1 710. The data for Image 1 710 can include Image Path, Photo Name, Image Width (pixels (px)), Image Height (pixels (px)), Range, Cable Pixels, Cable Diameter, Strand Pixels, Strand Diameter, and Strand Count. In accordance with an embodiment, the image data for the Image 1 710 can also be drag and dropped into the browse file dialogue (or tab), if desired.

FIG. 8 is another illustration of the graphical user interface 800 of the asset management system 200 in accordance with an exemplary embodiment. As shown in FIG. 8, using a photo imaging software, the cable measurement for the target area can be gathered and the pixel count can be calculated and entered for the selected cable and if needed the pixel count for the strand of the cable. In accordance with an embodiment, each of the images can include one or more cables or wires. For example, a single image may include two (2) or more cables or wires that measured. As shown in FIG. 8, the number of camera pixels for the cable or wire has been calculated to be eight (8) and one (1) for the Strand Pixels. The calculation of the number of pixels for the cable or wire and the strand of the cable or wire updates the Cable Diameter and Strand Diameter reading for Image 1 and begin calculations for Cable Mean, Cable standard deviation (STD), Strand Mean, and Strand STD on the left-hand side of the measurement tool as shown in FIG. 8.

In accordance with an embodiment, the same procedure can be repeated above for tabs Image 2 and Image 3, by selecting the appropriate photographs or images that the crew 150 wish to use for each of the images. After entering the information, the Cable Mean, Cable STD, Strand Mean, and Strand STD measurements can be compared against the individual readings to confirm that the measurements are within tolerance. In addition, all entered data is correct is also confirmed. If any values require correction, the appropriate tab can be selected, and the corrections can be made at this stage. If the data is correct the process proceeds to the next section to record the set.

Figure 9:
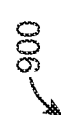
FIG. 9 is an illustration of an output file for the asset management system in accordance with an exemplary embodiment.

FIG. 9 is an illustration of an output file 900 for the asset management system 200 in accordance with an exemplary embodiment.

Recording Values

Data readings can be entered into an excel file, for example, named after the Site ID, which can help ensure that all Elements measured for a site will be grouped together in the resulting excel file.

Output Files

Site ID Excel file, which can be that begins with the Site ID File name and contain the grouped readings for each of the target elements you have taken readings on for the site. FIG. 9 is an example screenshot of the Site ID file that includes the Work log Excel file contains date and time information for each of the readings taken.

Output Values can include one or more of the following: Cable Mean—The calculated average of the individual Cable Diameters; Cable STD—The calculated standard deviation between the Cable Diameters; Strand Mean—The calculated average of the individual Strand Diameters; Strand STD—The calculated standard deviation between the Strand Diameters.

In accordance with the formulae process for the determination of the wire diameter for an electrical transmission line can include the following: (camera charge coupled device (ccd) sensor width (SW) times (×) altitude of flight above ground (AGL) times (×) 100) divided by (focal length of the camera determined by lens and zoom level used (FL) times (×) image width in pixels determined by the properties of the image taken (PW)). The formulae can be simplified to (SW×AGL×100)/(FL×PW)=Ground Sample Distance (GSD) of one pixel on the ground in the unit of measure from the AGL.

In addition, measuring the number of pixels across the subject in the photo in an image processing software yields the number of pixels the subject makes up. Multiplying the number of pixels by the GSD determined in the first formula yields the diameter in the unit of measure of the AGL, which can be simplified as GSD times (×) Pixel Count equal (=) Diameter of subject cable or wire.

Standard Application Attribute Definitions can include one or more of the following: Image width: width of image in pixels; Sensor width: width of the sensor in millimeters; Focal length: length of the focal length in millimeters; Cable width: width of cable in the photograph in pixels; Range: range of camera from cable (in Feet); and Offset: camera body offset from center of all measurements in millimeters. In accordance with an embodiment, the formula for calculating a diameter of cable or wire can include: (range+ offset)/3.28084*sensor width*100/round (focal length*image width)*cable width*0.393701. In addition, the formula for calculating the estimated cable or wire in includes can include: (merging the unit conversion constants): (range+offset)*sensor width/round (focal length*image width)*cable width*12; Output: Estimated cable diameter in inches.

FIG. 10 is a flowchart illustrating 1000 a computer-implemented method for determining wire diameter for electrical load transmission wires 110, 112 in accordance with an exemplary embodiment. As shown in FIG. 10, the computer-implemented method for determining diameter of an electrical transmission wire includes in step 1010, receiving, on a processing server, data for one or more images, the one or more images including one or more electrical transmission wires captured by an optical instrument. In step 1020, the processing server receives a distance from the optical instrument to the one or more electrical transmission wires. In step 1030, the processing server receives a number of pixels across the one or more electrical transmission wires in the one or more images. In step 1040, the processing server calculates an estimated diameter of the one or more electrical transmission wires based on the distance from the optical instrument to the one or more electrical transmission wires and the number of pixels across the one or more electrical transmission wires in the one or more images. In step 1050, the processing server outputs the estimated diameter of the one or more electrical transmission wires on a display. In accordance with an embodiment, the data for the one or more images includes one or more of a width of the one or more images in pixels and a height of the one or more images in pixels.

In accordance with an embodiment, the computer-implemented method can include the processing server receiving the number of pixels across the one or more electrical transmission wires in the one or more images by interpreting, by the processing server, the data for the one or more images to obtain the number of pixels across the one or more electrical transmission wires in the one or more images. In addition, the computer-implemented method can include identifying, by the processing server, the one or more electrical transmission wires in the one or more images with a machine learning algorithm; and calculating, by the processing server, the number of pixels across the one or more electrical transmission wires with the machine learning algorithm. For example, in accordance with an embodiment, the machine learning algorithm can be trained with a data set of one or more electrical transmission wires such that edges of the wire within the one or more images can be determined. Using the edges of the wire within the one or more images as determined by the machine learning algorithm, the number of pixels across the one or more electrical transmission wires can be determined.

In accordance with an embodiment, the one or more images comprises two or more images, and the processing server can calculate one or more of an average of the estimated diameter for the one or more electrical transmission wires from the two or more images, and a standard deviation between the estimated diameters for the one or more electrical transmission wires for the two or more images.

In accordance with an embodiment, the computer-implemented method can further include receiving, by processing server, a number of strands for the one or more electrical transmission wires and a number of pixels for one or more strands of the one or more electrical transmission wires; and calculating, by the processing server, a strand diameter for the one or more electrical transmission wires based on the number of strands for the one or more electrical transmission wires and the number of pixels for one or more strands of the one or more electrical transmission wires. The one or more images can be two or more images, and the processing server can calculate one or more of an average of the estimated strand diameter for the one or more electrical transmission wires from the two or more images, and a standard deviation between the estimated strand diameter for the one or more electrical transmission wires for the two or more images.

In accordance with an embodiment, the computer-implemented method can include receiving, by the processing server, a sensor width, a focal length, and an altitude of flight above a ground surface for the optical instrument used to capture the data for the one or more images, and calculating, by the processing server, a ground sample distance of one pixel on the ground surface in a unit of measure from the altitude of flight above the ground surface. In addition, the computer-implemented method can include calculating, by the processing server, the estimated diameter of the electrical transmission wire based on multiplying the ground sample distance of one pixel on the ground surface times the number of pixels received across the one or more electrical transmission wires in the one or more images.

In accordance with an embodiment, the optical instrument is a camera having a lenses having a focal length of 200 mm to 1,200 mm. In addition, the computer-implemented method can classify, by the processing server, a type of electrical transmission wire based on the estimated diameter of the one or more electrical transmission wires, the types of electrical wire including a low voltage wire, a medium voltage wire, a high voltage wire, and an extreme high voltage wire. For example, the low voltage wire can be, for example, 0 to 1000 Volts (V), the medium voltage wire can be, for example 1000 V to 50,000 V, the high voltage wire can be, for example, 50,000 V to 200,000V, and the extreme high voltage wire can be, for example, in excess of 200,000 V.

Figure 11:
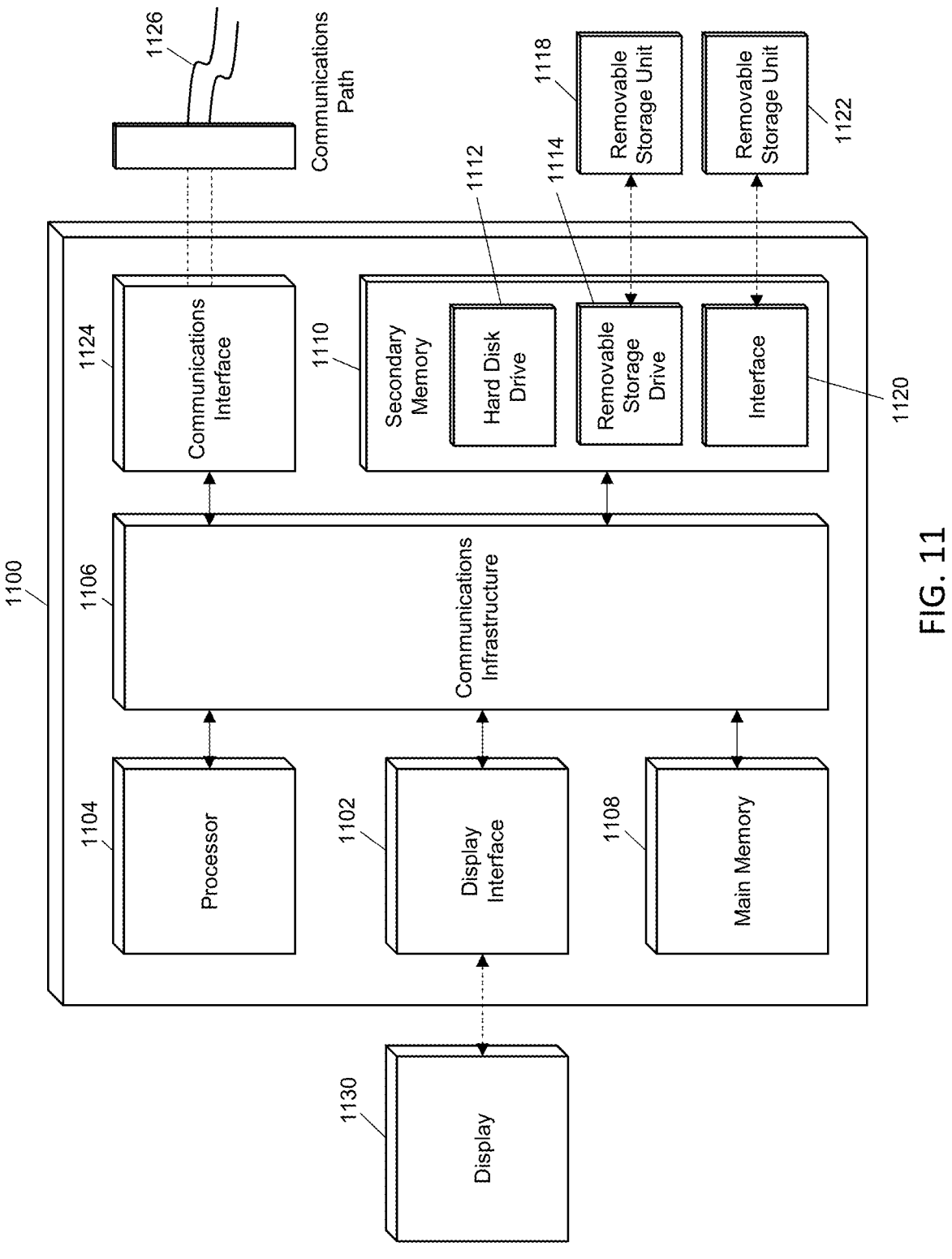
FIG. 11 illustrates a representative computer system for executing a method for determining wire diameter for electrical load transmission.

FIG. 11 illustrates a representative computer system 1100 in which embodiments of the present disclosure, or portions thereof, may be implemented as computer-readable code executed on hardware. For example, the one or more optical imaging devices (or cameras) 130, the one or more distance measuring devices (or rangefinders or rangefinder telemeters) 132, the one or more computer systems 140, and the method and system for determining wire diameter for electrical transmission lines as shown in FIGS. 1-10 may be implemented in whole or in part by a computer system 1100 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1118, a removable storage unit 1122, and a hard disk installed in hard disk drive 1112.

Various embodiments of the present disclosure are described in terms of this representative computer system 1100. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device (or processing server) 1104 may be processor device specifically configured to perform the functions discussed herein. The processor device 1104 may be connected to a communications infrastructure 1106, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 1100 may also include a main memory 1108 (e.g., random access memory, read-only memory, etc.), and may also include a secondary memory 1110. The secondary memory 1110 may include the hard disk drive 1112 and a removable storage drive 1114, such as a floppy disk drive, a magnetic tape drive, an optical disk drive, a flash memory, etc.

The removable storage drive 1114 may read from and/or write to the removable storage unit 1118 in a well-known manner. The removable storage unit 1118 may include a removable storage media that may be read by and written to by the removable storage drive 1114. For example, if the removable storage drive 1114 is a floppy disk drive or universal serial bus port, the removable storage unit 1118 may be a floppy disk or portable flash drive, respectively. In one embodiment, the removable storage unit 1118 may be non-transitory computer readable recording media.

In some embodiments, the secondary memory 1110 may include alternative means for allowing computer programs or other instructions to be loaded into the computer system 1100, for example, the removable storage unit 1122 and an interface 1120. Examples of such means may include a program cartridge and cartridge interface (e.g., as found in video game systems), a removable memory chip (e.g., EEPROM, PROM, etc.) and associated socket, and other removable storage units 1122 and interfaces 1120 as will be apparent to persons having skill in the relevant art.

Data stored in the computer system 1100 (e.g., in the main memory 1108 and/or the secondary memory 1110) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1100 may also include a communications interface 1124. The communications interface 1124 may be configured to allow software and data to be transferred between the computer system 1100 and external devices. Exemplary communications interfaces 1124 may include a modem, a network interface (e.g., an Ethernet card), a communications port, a PCMCIA slot and card, etc. Software and data transferred via the communications interface 1124 may be in the form of signals, which may be electronic, electromagnetic, optical, or other signals as will be apparent to persons having skill in the relevant art. The signals may travel via a communications path 1126, which may be configured to carry the signals and may be implemented using wire, cable, fiber optics, a phone line, a cellular phone link, a radio frequency link, etc.

The computer system 1100 may further include a display interface 1102. The display interface 1102 may be configured to allow data to be transferred between the computer system 1100 and external display 1130. Exemplary display interfaces 1102 may include high-definition multimedia interface (HDMI), digital visual interface (DVI), video graphics array (VGA), etc. The display 1130 may be any suitable type of display for displaying data transmitted via the display interface 1102 of the computer system 1100, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 1108 and secondary memory 1110, which may be memory semiconductors (e.g., DRAMs, etc.). These computer program products may be means for providing software to the computer system 1100. Computer programs (e.g., computer control logic) may be stored in the main memory 1108 and/or the secondary memory 1110. Computer programs may also be received via the communications interface 1124. Such computer programs, when executed, may enable computer system 1100 to implement the present methods as discussed herein. In particular, the computer programs, when executed, may enable processor device 1104 to implement the methods illustrated by FIGS. 1-10, as discussed herein. Accordingly, such computer programs may represent controllers of the computer system 1100. Where the present disclosure is implemented using software executed on hardware, the software may be stored in a computer program product and loaded into the computer system 1100 using the removable storage drive 1114, interface 1120, and hard disk drive 1112, or communications interface 1124.

The processor device 1104 may comprise one or more modules or engines configured to perform the functions of the computer system 1100. Each of the modules or engines may be implemented using hardware and, in some instances, may also utilize software executed on hardware, such as corresponding to program code and/or programs stored in the main memory 1108 or secondary memory 1110. In such instances, program code may be compiled by the processor device 1104 (e.g., by a compiling module or engine) prior to execution by the hardware of the computer system 1100. For example, the program code may be source code written in a programming language that is translated into a lower level language, such as assembly language or machine code, for execution by the processor device 1104 and/or any additional hardware components of the computer system 1100. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1100 to perform the functions disclosed herein. It will be apparent to persons having skill in the relevant art that such processes result in the computer system 1100 being a specially configured computer system 1100 uniquely programmed to perform the functions discussed above.

Techniques consistent with the present disclosure provide, among other features, a method and system for determining diameter of electrical transmission wires. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for determining diameter of an electrical transmission wire with an asset management system, the method comprising:

receiving, on a processing server of an on-site portable computer system, data for an image of a plurality of images, the image selected on a graphical user interface of the on-site portable computer system, and wherein the image includes one or more electrical transmission wires captured by a camera;

receiving, by the processing server of the on-site portable computer system, a distance from the camera to the one or more electrical transmission wires;

receiving, by the processing server of the on-site portable computer system, attributes of the camera, the attributes of the camera including sensor width, sensor height, lens focal length, camera body offset, and an altitude of flight above a ground surface for the camera used to capture the data for the image from input on the graphical user interface of the on-site portable computer system, and wherein the input on the graphical user interface of the on-site portable computer system for the attributes of the camera is a selection from a drop-down list of one or more cameras and lenses;

calculating, by the processing server of the on-site portable computer system, a ground sample distance of one pixel on the ground surface in a unit of measure from the altitude of flight above the ground surface;

calculating, by the processing server of the on-site portable computer system, a number of pixels across the one or more electrical transmission wires in the image;

calculating, with the processing server of the on-site portable computer system, an estimated diameter of the one or more electrical transmission wires based on the distance from the camera to the one or more electrical transmission wires, the attributes of the camera, and the number of pixels across the one or more electrical transmission wires in the image; and outputting, by the processing server of the on-site portable computer system, the estimated diameter of the one or more electrical transmission wires on the graphical user interface of the on-site portable computer system.

2. The computer-implemented method according to claim 1, wherein the data for the image includes one or more of a width of the image in pixels and a height of the image in pixels.

3. The computer-implemented method according to claim 1, wherein the calculating by the processing server of the number of pixels across the one or more electrical transmission wires in the image-comprises:

interpreting, by the processing server of the on-site portable computer system, the data for the image to obtain the number of pixels across the one or more electrical transmission wires in the image.

4. The computer-implemented method according to claim 3, further comprising:

identifying, by the processing server of the on-site portable computer system, the one or more electrical transmission wires in the image with a machine learning algorithm; and calculating, by the processing server of the on-site portable computer system, the number of pixels across the one or more electrical transmission wires with the machine learning algorithm.

5. The computer-implemented method according to claim 1, wherein the image comprises two or more images; and calculating, by the processing server of the on-site portable computer system, one or more of an average of the estimated diameter for the one or more electrical transmission wires from the two or more images, and a standard deviation between the estimated diameters for the one or more electrical transmission wires for the two or more images; and confirming, by the processing server of the on-site portable computer system, that the one or more of the calculated average of the estimated diameter for the one or more electrical transmission wires from the two or more images, and the standard deviation between the estimated diameters for the one or more electrical transmission wires for the two or more images are within a predetermined tolerance.

6. The computer-implemented method according to claim 1, further comprising:

calculating, by processing server of the on-site portable computer system, a number of strands for the one or more electrical transmission wires and a number of pixels for one or more strands of the one or more electrical transmission wires;

calculating, by the processing server of the on-site portable computer system, a strand diameter for the one or more electrical transmission wires based on the number of strands for the one or more electrical transmission wires and the number of pixels for one or more strands of the one or more electrical transmission wires.

7. The computer-implemented method according to claim 6, wherein the image comprises two or more images; and calculating, by the processing server of the on-site portable computer system, one or more of an average of the estimated strand diameter for the one or more electrical transmission wires from the one or more images, and a standard deviation between the estimated strand diameter for the one or more electrical transmission wires for the two or more images; and confirming, by the processing server of the on-site portable computer system, that the one or more of the calculated average of the estimated diameter for the one or more electrical transmission wires from the two or more images, and the standard deviation between the estimated diameters for the one or more electrical transmission wires for the two or more images are within a predetermined tolerance.

8. The computer-implemented method according to claim 1, further comprising:

calculating, by the processing server of the on-site portable computer system, the estimated diameter of the one or more electrical transmission wires based on multiplying the ground sample distance of one pixel on the ground surface times the number of pixels received across the one or more electrical transmission wires in the image.

9. The computer-implemented method according to claim 1, wherein the camera has a lenses having a focal length of 200 mm to 1,200 mm.

10. The computer-implemented method according to claim 1, further comprising:

classifying, by the processing server of the on-site portable computer system, a type of electrical transmission wire based on the estimated diameter of the one or more electrical transmission wires, the types of electrical wire including a low voltage wire, a medium voltage wire, a high voltage wire, and an extreme high voltage wire, the low voltage wire being up to 1000 Volts (V), the medium voltage wire being 1000 V to 50,000 V, the high voltage wire being 50,000 V to 200,000V, and the extreme high voltage wire being in excess of 200,000 V.

11. The computer-implemented method according to claim 1, wherein the processing server of the on-site portable computer system calculates the estimated diameter of the one or more electrical transmission wires and outputs the estimated diameter of the one or more electrical transmission wires on the graphical user interface of the on-site portable computer system in real time.

12. The computer-implemented method according to claim 1, wherein each of the receiving data for the image of the plurality of images, receiving the distance from the camera to each of the one or more electrical transmission wires, calculating the ground sample distance of one pixel on the ground surface in the unit of measure from the altitude of flight above the ground surface, calculating the number of pixels across the one or more electrical transmission wires in the image, and calculating the estimated diameter of the one or more electrical transmission wires by the on-site portable computer system, and outputting the estimated diameter of the one or more electrical transmission wires on the graphical user interface of the on-site portable computer system are performed in real time.

13. A system for determining diameter of an electrical transmission wire, the system comprising:

a camera configured to capture an image including one or more electrical transmission wires;

a distance measuring device configured to determine a distance from the camera to the one or more electrical transmission wires; and a processing server of a portable computer system, the portable computer system having an asset management system, the processing server of the portable computer system configured to execute the following on-site:

receive data for an image of a plurality of images, the image selected on a graphical user interface of the portable computer system, and wherein the image includes the one or more electrical transmission wires captured by the camera;

receive the distance from the camera to the one or more electrical transmission wires from the distance measuring device;

receive attributes of the camera, the attributes of the camera including sensor width, sensor height, lens focal length, and camera body offset from input on the graphical user interface of the portable computer system, and wherein the input on the graphical user interface of the portable computer system for the attributes of the camera is a selection from a drop-down list of one or more cameras and lenses;

interpret the data for the image to obtain the number of pixels across the one or more electrical transmission wires in the image;

identify the one or more electrical transmission wires in the image with a machine learning algorithm;

calculate a number of pixels across the one or more electrical transmission wires in the image with the machine learning algorithm;

calculate an estimated diameter of the one or more electrical transmission wires based on the distance from the camera to the one or more electrical transmission wires, the attributes of the camera, and the number of pixels across the one or more electrical transmission wires in the image; and output the estimated diameter of the one or more electrical transmission wires to the graphical user interface of the asset management system.

14. The system according to claim 13, wherein the data for the image includes one or more of a width of the image in pixels and a height of the image in pixels.

15. The system according to claim 13, wherein the image comprises two or more images, and the processing server is configured to:

calculate one or more of an average of the estimated diameter for the one or more electrical transmission wires from the two or more images, and a standard deviation between the estimated diameters for the one or more electrical transmission wires for the two or more images; and confirming that the one or more of the calculated average of the estimated diameter for the one or more electrical transmission wires from the two or more images, and the standard deviation between the estimated diameters for the one or more electrical transmission wires for the two or more images are within a predetermined tolerance.

16. The system according to claim 13, wherein the processing server is configured to:

calculate a number of strands for the one or more electrical transmission wires and a number of pixels for one or more strands of the one or more electrical transmission wires; and calculate a strand diameter for the one or more electrical transmission wires based on the number of strands for the one or more electrical transmission wires and the number of pixels for one or more strands of the one or more electrical transmission wires.

17. The system according to claim 13, wherein the calculated estimated diameter of the one or more electrical transmission wires and the output of the estimated diameter of the one or more electrical transmission wires on the graphical user interface of the portable computer system is performed in real time.

18. A non-transitory computer readable medium storing computer readable program code that, when executed by a processor of a portable computer system, the portable computer system having an asset management system, which causes the processor to determine a diameter of an electrical transmission wire on-site, the program code comprising instructions for:

receiving data for an image of a plurality of images, the image selected on a graphical user interface of the portable computer system, and wherein the image includes one or more electrical transmission wires captured by a camera;

receiving a distance from the camera to each of the one or more electrical transmission wires;

receiving attributes of the camera, the attributes of the camera including sensor width, sensor height, lens focal length, and camera body offset from input on the graphical user interface of the portable computer system, and wherein the input on the graphical user interface of the portable computer system for the attributes of the camera is a selection from a drop-down list of one or more cameras and lenses;

interpreting the data for the image to obtain the number of pixels across the one or more electrical transmission wires in the image;

identifying the one or more electrical transmission wires in the image with a machine learning algorithm;

calculating a number of pixels across the one or more electrical transmission wires in the image with the machine learning algorithm;

calculating an estimated diameter of the one or more electrical transmission wires based on the distance from the camera to the one or more electrical transmission wires, the attributes of the camera, and the number of pixels across the one or more electrical transmission wires in the image; and sending the estimated diameter of the one or more electrical transmission wires to the graphical user interface of the portable computer system.

19. The non-transitory computer readable medium according to claim 18, wherein the data for the image includes one or more of a width of the image in pixels and a height of the image in pixels.

20. The non-transitory computer readable medium according to claim 18, wherein the calculated estimated diameter of the one or more electrical transmission wires and the output of the estimated diameter of the one or more electrical transmission wires on the graphical user interface of the asset management system is performed in real time.

* * * * *